US010499632B2

(12) United States Patent
MacKenzie

(10) Patent No.: US 10,499,632 B2
(45) Date of Patent: Dec. 10, 2019

(54) METHODS AND APPARATUS FOR APPLYING SUBSTANCES TO AN AREA OF INTEREST

(75) Inventor: Craige Hector MacKenzie, Ashburton (NZ)

(73) Assignee: Mackenzie Research Group Lt.d, Ashburton (NZ)

(*) Notice: Subject to any disclaimer, the term of this patent is extended or adjusted under 35 U.S.C. 154(b) by 1142 days.

(21) Appl. No.: 13/522,860

(22) PCT Filed: Jan. 20, 2011

(86) PCT No.: PCT/NZ2011/000004
§ 371 (c)(1),
(2), (4) Date: Jul. 18, 2012

(87) PCT Pub. No.: WO2011/102739
PCT Pub. Date: Aug. 25, 2011

(65) Prior Publication Data
US 2012/0297674 A1    Nov. 29, 2012

(30) Foreign Application Priority Data

Jan. 21, 2010  (NZ) ........................................ 582798

(51) Int. Cl.
*A01M 7/00* (2006.01)
*A01B 79/00* (2006.01)
(Continued)

(52) U.S. Cl.
CPC ......... *A01M 7/0089* (2013.01); *A01B 79/005* (2013.01); *A01C 21/007* (2013.01); *A01M 21/043* (2013.01)

(58) Field of Classification Search
CPC .......... A01G 1/001; A01G 7/00; A01G 31/02; A01C 21/00; A01C 21/007
(Continued)

(56) References Cited

U.S. PATENT DOCUMENTS

| 4,252,274 A | * | 2/1981 | Kubacak | ................. E01H 11/00 239/163 |
| 4,609,145 A | * | 9/1986 | Miller | ................. A01M 7/0014 239/159 |

(Continued)

FOREIGN PATENT DOCUMENTS

| NZ | 254659 | 9/1996 |
| WO | WO 98/21943 | 5/1998 |

(Continued)

OTHER PUBLICATIONS

International Search Report for International Application No. PCT/NZ2011/000004 dated May 17, 2011.

*Primary Examiner* — Andrea M Valenti
(74) *Attorney, Agent, or Firm* — Merchant & Gould P.C.

(57) ABSTRACT

An apparatus for applying one or more substances to an area of interest, the apparatus having sensors detecting one or more conditions of a sample area proximate the sensor, wherein, the control system is configured to allow for an operator selection between distributing or not distributing a substance or substances via the independently operable outlet(s) controlled by the control system when the control system determines: the sample area proximate at least one sensor or group of sensors is having one or more conditions which meet at least one predetermined condition parameter for that or those condition(s); or the sample area proximate at least one sensor or group of sensors is having one or more conditions which do not meet at least one predetermined condition parameter for that or those condition(s).

6 Claims, 2 Drawing Sheets

(51) Int. Cl.
*A01M 21/04* (2006.01)
*A01C 21/00* (2006.01)

(58) Field of Classification Search
USPC .......................................... 47/58.1 R, 1.5, 1.7
See application file for complete search history.

(56) References Cited

U.S. PATENT DOCUMENTS

| | | | | |
|---|---|---|---|---|
| 5,144,767 | A | * | 9/1992 | McCloy et al. ................. 47/1.7 |
| 5,296,702 | A | | 3/1994 | Beck et al. |
| 5,507,115 | A | | 4/1996 | Nelson |
| 5,606,821 | A | * | 3/1997 | Sadjadi et al. ................... 47/1.7 |
| 5,768,823 | A | * | 6/1998 | Nelson ............................. 47/1.7 |
| 5,924,239 | A | * | 7/1999 | Rees et al. ....................... 47/1.7 |
| 6,009,354 | A | * | 12/1999 | Flamme et al. ............. 700/184 |
| 6,393,927 | B1 | * | 5/2002 | Biggs ................... A01C 21/007 73/866 |
| 6,444,975 | B1 | * | 9/2002 | Reusch ...................... 250/222.1 |
| 6,596,996 | B1 | * | 7/2003 | Stone et al. ............... 250/341.8 |
| 7,848,865 | B2 | * | 12/2010 | Di Federico et al. .......... 701/50 |

FOREIGN PATENT DOCUMENTS

| | | |
|---|---|---|
| WO | WO 99/16005 | 4/1999 |
| WO | WO 99/52354 | 10/1999 |
| WO | WO 03/010521 | 2/2003 |

\* cited by examiner

METHODS AND APPARATUS FOR APPLYING SUBSTANCES TO AN AREA OF INTEREST

STATEMENT OF CORRESPONDING APPLICATIONS

This application is a National Stage Application of PCT/NZ2011/000004, filed 20 Jan. 2011, which claims benefit of Serial No. 582798, filed 21 Jan. 2010 in New Zealand and which applications are incorporated herein by reference. To the extent appropriate, a claim of priority is made to each of the above disclosed applications.

TECHNICAL FIELD

The present invention relates improvements in and relating to methods and apparatus for applying substances to an area of interest.

BACKGROUND ART

For the purposes of clarity only, the present invention will be described in the embodiment of a method and apparatus for applying nitrogen, nitrate inhibitor or weed spray to an area of interest in the form of a pasture. However as will be appreciated by those skilled in the art, the present invention may be suitable for the selective application of different substances to any area of interest.

The application of nitrogen and nitrate inhibitor to a pasture is known in the art of pastoral farming. Current practice is for nitrogen to be distributed evenly across a field or pasture to promote growth of the desired crop species. Typically, a number of samples are taken to determine the level of nitrogen to be applied. The disadvantage of this approach is that this very broad-brush method of sampling does not take into account relatively small randomly located spots that may have a high localised level of nitrogen Such small spots of high nitrogen arise due to, for example, animal excrement or decomposition of organic matter. Under the current approach, these spots have yet further nitrogen added. This is both an additional cost to the farmer and can be a source of nitrates leaching into nearby waterways and aquifers.

Equally, the application of nitrate inhibitor to a pasture is currently performed by evenly distributing nitrate inhibitor across the field or pasture, without account for localised areas of high nitrogen.

Methods of detecting areas of high nitrogen are known in the art, however most are complex and involve the testing of soil and plant tissue. One method which does not use chemicals, relies on the effect of nitrogen on the growth rates of plants. Plants growing in areas having a high level of nitrogen will grow much more rapidly than plants growing in areas having a low level of nitrogen in the soil. Therefore, by analysing the relative growth of plants across a field or pasture, the regions having high levels of nitrogen can be determined. The only method known to the applicant for selectively applying nitrate inhibitor to these areas of high nitrogen is to manually apply nitrate inhibitor to those areas exhibiting more rapid plant growth.

Methods for differentiating plants from their surroundings are known in the art, one such example is detailed in NZ 254659. This patent specification discloses an apparatus which projects two wavelengths of light which are readily absorbed by the chlorophyll in plants and wavelengths of light which are strongly reflected by the chlorophyll in plants. By analysing the light reflected, the apparatus is able to determine both the presence and size of a plant due to the amount of light absorbed by the chlorophyll. The apparatus of NZ 254659 describes a method for the application of weed spray to plants which meets a certain user calibrated threshold of reflected chlorophyll absorbent light to reflected non chlorophyll absorbent light (i.e. the condition that exists when a plant is detected). The disadvantage of systems such as NZ 254659 are that they are only capable of selectively applying a substance such as a weed spray to areas when certain conditions are determined to exist. However, it would be useful if in some circumstances an apparatus could instead be easily reconfigured to continually apply a substance unless certain conditions are determined to exist or not exist.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention, there is provided an apparatus for applying one or more substances to an area of interest, the apparatus including:
  at least one control system;
  at least one sensor associated with the control system;
  at least one independently operable outlet, for distribution of at least one substance associated with at least one sensor;
  at least one source of substance associated with the independently operable outlets,
wherein each sensor detects one or more conditions of a sample area proximate the sensor,
wherein, the control system is configured to allow for an operator selection between distributing or not distributing a substance or substances via the independently operable outlet(s) controlled by the control system when the control system determines:
  the sample area proximate at least one sensor or group of sensors having one or more conditions which meet at least one predetermined condition parameter for that or those condition(s); or
  the sample area proximate at least one sensor or group of sensors having one or more conditions which do not meet at least one predetermined condition parameter for that or those condition(s).

It should be understood that in the context of the present invention that the term 'meet' or 'not meet' is dependent on the mode of distributing substances selected by the operator of the system and each term may interchangeably refer to a characteristic that is:

sensed as being greater than a predetermined condition parameter; or sensed as being less than a predetermined condition parameter; or sensed as being the same as, or within, a predetermined condition parameter.

It should also be noted that in the context of the present application, a predetermined condition could refer to either a single value relating to a characteristic, or to a range of values which are considered to define that characteristic.

In the context of the present invention, an area of interest is any substantially uniform surface onto which a substance is to be distributed on a selective basis. A non limiting list of possible surfaces includes:

roadways;
footpaths;
fields;
pastures;
tiled areas;
carpet.

It should also be understood that a sample area, is an area within the area of interest that is defined by the bounds of the sensor(s) detecting the conditions of the area of interest. The bounds of the sensor being the surface proximate the sensor upon which the sensor is able to resolve the desired conditions.

It will be apparent to a person skilled in the art that there could be any number of ways and specific conditions by which the apparatus could sense the conditions of a sample area proximate the sensor. The exact nature and configuration of the sensor(s) should therefore not be seen as being limiting.

It will be understood to a person skilled in the art that a control system encompasses all of the componentry that may be included between the one or more sensors and the independently operable outlet(s) and may include both discrete and/or integrated electronic componentry, mechanical valves, switches, relays or the like.

In some preferred embodiments the control system may comprise discrete electronic components which have been interconnected in a manner which provides the required control of one or each independently operable outlet. The components required for such control and the manner of interconnection of those components will be known to a person skilled in the art of electronics and therefore should not be seen as being limiting.

In especially preferred embodiments the control system includes at least one microprocessor.

In preferred embodiments the or each microprocessor incorporates a computer executable set of instructions which provide control signals for operation of one or each independently operable outlet based on the signals received from the, or each, sensor.

In preferred embodiments the apparatus includes a plurality of sensors.

In preferred embodiments each sensor is associated with an independently operable outlet.

In other preferred embodiments each sensor may be associated with a cluster of independently operable outlets.

It will be apparent to a person skilled in the art that a plurality of independently operable outlets may be clustered together to facilitate even distribution of substances to substantially cover the sample area sensed by an associated sensor or group of sensors.

It will also be appreciated that a cluster of independently operable outlets may also facilitate the simultaneous, or optional, application of more than one substance to a sample area. This could be based upon two sets of conditions being met, for example, the sample area could be detected as being very dry as well as having a weed present, and therefore distribution of a wetting agent with the weed spray may be desirable.

In preferred embodiments, the sensor(s) are configured to detect the nitrogen levels between plants proximate the sensor(s).

In some preferred embodiments, the sensor(s) are configured to detect the level of chlorophyll production of plants proximate the sensor(s) (which can be directly correlated to plant nitrogen levels).

In one especially preferred embodiment, the sensor(s) are configured to detect the level of chlorophyll production by analyzing the relative amounts of reflection of known wavelengths of light. These sensors are described in NZ 254659. In other embodiments the sensor(s) may be in the form of a camera or the like, which visually identifies the type and size of a plant. This could be achieved by image and or colour matching techniques known in the art.

In one preferred embodiment, each sensor may have associated with it a cluster of independently operable outlets for distribution of different substances, each outlet being capable of independently distributing a desired substance depending upon the level of one or more sensed condition(s). A non-limiting example, based upon the application of both nitrate inhibitor and weed spray, would involve:

taking no action upon sensing plants with a nitrogen level (level of chlorophyll production) below a predetermined condition parameter for chlorophyll content;

applying nitrate inhibitor to any plants sensed as having a nitrogen level (level of chlorophyll production) falling within a predetermined condition parameter for chlorophyll content;

applying weed spray to any plants sensed as having a nitrogen level (level of chlorophyll production) exceeding the predetermined condition parameter for chlorophyll content.

The independent outlets may be associated with the sensors in a number of different ways.

In some embodiments each sensor or group of sensors may include a microprocessor and the sensor may be coupled to the outlets to electronically open or close the outlet depending on the condition(s) detected by the sensor.

In preferred embodiments each sensor or group of sensors may be connected to a control system and the control system may be electronically coupled to the outlets to open or close one or more outlets depending on the condition(s) detected by the sensors.

It will be apparent to a person skilled in the art that the processor may determine that upon sensing a characteristic of a single area of interest proximate a single sensor, that other outlets adjacent the outlet associated with that sensor should also be activated, even though the sensors associated with those outlets did not detect that characteristic with their respective areas of interest. An example of this situation may be envisaged wherein the area of interest is a field containing a plant crop, the sensors are, for the purpose of the example, configured to detect the size and leaf shape of an invasive plant species. It is known by the user of the apparatus that the invasive plant tends to grow together and therefore that where there is one plant there are likely to be others nearby. The sensed plant being the parent may be larger than its siblings and therefore may be the only invasive plant detected. Provided the herbicide being applied does not adversely affect the crop species, it would be advantageous to distribute the herbicide over a large enough area to include both the siblings of, and the detected invasive plant. In one preferred embodiment, each independently operable outlet or cluster of independently operable outlets for the distribution of substances may have associated with it a group of sensors. It would be apparent to a person skilled in the art that a large number of more disparate conditions may be used for the identification and determination of conditions relating to a sample area. Therefore, a number of different sensors may be required in order to accurately determine the conditions of a sample area.

In preferred embodiments the outlets include an electro-mechanical apparatus for converting the control signal from the processor into a mechanical operation to either activate or deactivate distribution of a substance from the outlet.

In preferred embodiments each substance to be distributed has associated with it a container, such as a tank. However, it will be apparent to a person skilled in the art that the exact form of the container is dependent on the substance contained therein, for example, fluid substances would be contained in a tank, whereas granular substances will be contained in a hopper. Therefore the exact nature of the container should not be seen as being limiting.

In some other embodiments the substance may be in the form of an inlet, wherein the substance is supplied, rather than contained in its final form. An example of this would be where a number of substances are combined to form a further substance which is then distributed to a sample area.

In some preferred embodiments the source of substance(s) to be distributed may be one or more fluid tanks and the associated independently operable outlet may be an electronically activated spray nozzle. The substances may be gravity feed via pipes to the independent operable outlets or may be driven via a pump or such like.

In other preferred embodiments the source of substance(s) to be distributed may be one or more hoppers and the associated independently operable outlet may be an electronically activated spreader.

In preferred embodiments, each outlet is capable of being independently activated or deactivated based upon the data processed in relation to the sensor(s) associated with an outlet.

In preferred embodiments, the means for processing the sensor data is a microprocessor executing a computer executable algorithm.

In preferred embodiments, each sensor or group of sensors includes an associated processor.

In preferred embodiments, a condition parameter(s) to which the condition(s) of a sample area are compared are user adjustable.

It will be apparent to a person skilled in the art that the condition parameter for each condition will depend upon the condition being compared and the specific conditions of the sample area. to which one or more substances are being distributed.

In preferred embodiments, the condition being sensed is the nitrogen level, via detection of chlorophyll production.

In other preferred embodiments the condition(s) being compared may, in relation to the area of interest being a field, include, but not be limited to:
  leaf size;
  leaf shape;
  plant size;
  plant shape;
  plant colour;
  the level of nitrous oxide production due to bacterial breakdown of nitrogen in the soil;
  the level of chlorophyll content by a plant.

In some preferred embodiments one or more condition(s) may be sensed, in order to more efficiently distribute substances to the sample area. For example, in the case of applying nitrate inhibitor, a combination of plant size and leaf shape may be used to determine whether a plant has a high nitrogen level and therefore requires nitrate inhibitor to be applied. A weed growing in a pasture containing a substantially uniform crop may be detected as being larger in size than the predetermined condition parameter for the size of the crop plant species. Without any other form of conditional determination, nitrate inhibitor would be inefficiently applied to that weed. By including the additional sensing of the leaf shape, the leaf shape of the weed would be compared to the predetermined condition parameter for leaf size, the weed may then be determined as not being a crop species and nitrate inhibitor would not be applied. In some embodiments an alternative independently operable outlet may distribute weed spray onto the weed.

In preferred embodiments, the condition parameter(s) to which conditions in a sample area are compared are adjustable by the operator.

In preferred embodiments, the condition parameter relating to nitrogen level, via detection of chlorophyll content, can be adjusted by the user of the said apparatus to differentiate between the levels of chlorophyll content of adjacent plants or groups of plants.

It will be apparent to a person skilled in the art that the substance to be distributed onto a sample area is a user selectable choice. Although the present invention is particularly suited to the application of nitrogen, nitrate inhibitor or weed spray to a pasture, or part thereof, the exact composition of the substance(s) that can be distributed by the apparatus should not be seen as being limiting. Equally the area of interest is a user selectable choice, and therefore should not be seen as being limiting.

In preferred embodiments, the substance being applied to a pasture could be any one of, but should not be limited to:
  weedspray;
  nitrogen;
  nitrate inhibitor.

It will be apparent to a person skilled in the art that a plant or plants detected as having higher levels of nitrogen, a different size or a different plant type than the surrounding crop could be any one of, but should not be limited to:
  a plant which differs from the intended crop, such as a weed (which grows faster than the surrounding crop);
  a plant which is the same as the intended crop but which is growing faster than the surrounding crop;
  an area upon which a source of nitrogen has been applied, such as would occur due to animal excrement or the like.

In other preferred embodiments the area of interest may include any of a roadway or car park, a building or part thereof. The area of interest being a user choice should therefore not be seen as being limiting.

In such embodiments as described above, the substance being distributed could be any one of, but should not be limited to:
  paint (upon detection of faded paint, or graffiti on a building);
  salt (upon ice detection on a road or the like);

insecticide (upon detection of pools of water which may harbor mosquito larvae or the like).

It will also be apparent to a person skilled in the art that the operator selection between distributing or not distributing a substance or substances via at least one independently operable outlet associated with a sensor or sensors when:
- a sample area proximate at least one sensor or group of sensors is detected by the sensor(s) as having one or more conditions which exceed at least one predetermined condition parameter for that or those condition(s); or
- a sample area proximate at least one sensor or group of sensors is detected by the sensor(s) as having one or more conditions which match at least one predetermined condition parameter for that or those, condition(s); or
- a sample area proximate at least one sensor or group of sensors is detected by the sensor(s) as having one or more conditions which do not meet at least one predetermined condition parameter for that or those condition(s), will depend upon the nature of the substance being distributed, this is clarified by way of the non limiting examples provided below.

Example 1: Application of Nitrogen to a Pasture

If nitrogen is being applied to a pasture, the operator of the apparatus will calibrate the sensor(s) associated with the characteristic of nitrogen level (such as determined by measuring chlorophyll content), or crop species size, to a desired minimum level, and select a mode of distribution such that nitrogen is only applied to plants detected as falling below the calibrated condition parameter(s) for minimum nitrogen level, or crop size.

As will be understood by a person skilled in the art, this may result in nitrogen being applied to an entire crop, except where a weed, larger than the surrounding crop plants, or crop plants which are sensed as having a higher nitrogen level, or crop size, than the calibrated minimum level condition parameter for nitrogen or crop size. Alternatively, nitrogen may only be applied where a crop plant is sensed as having a nitrogen level below the minimum level condition parameter, or being smaller than the calibrated condition parameter for crop size.

Example 2: Application of Nitrate Inhibitor to a Pasture

If nitrate inhibitor is being applied to a pasture, the operator of the apparatus will calibrate the sensor(s) associated with the characteristic of nitrogen level to a desired maximum nitrogen level (such as determined by measuring chlorophyll content), or crop species size, to a desired maximum level, and select a mode of distribution such that nitrate inhibitor is only applied to plants detected as exceeding the calibrated condition parameter(s) for maximum nitrogen level, or crop size.

As will be understood by a person skilled in the art, this may result in nitrate inhibitor being applied to an entire crop, except where a plant is detected as having a nitrogen level lower than the maximum calibrated condition parameter for crop size, or the plant is smaller than normal crop plant; or a plant different from the crop species having a lower nitrogen level is detected. Alternatively, nitrate inhibitor may only be applied where a crop plant is detected as having a nitrogen level higher than the calibrated maximum condition parameter for nitrogen level, or a plant which, is larger than the calibrated condition parameter for crop size is detected.

Example 3: Application of Weed Spray to a Pasture

If weed spray is being applied to a pasture, the operator of the apparatus will calibrate the sensor(s) associated with the characteristic of chlorophyll level to a desired maximum chlorophyll level content or crop species size to a desired maximum level and select a mode of distribution such that weed spray is only applied to plants detected as exceeding the calibrated condition parameter for maximum chlorophyll level, or crop size.

As will be understood by a person skilled in the art, pastoral weed species such as thistles, dock or the like grow significantly faster than typical crop species. Therefore weeds and undesired crop species are generally detected as having a higher chlorophyll level and/or size than the surrounding crop. Therefore, weed spray is applied to plants detected as having a chlorophyll level above the user calibrated condition parameter for chlorophyll and/or crop size.

According to a further aspect of the present invention, there is provided a method for the application of substances to one or more sample areas within an area of interest, the method including the steps of:
- selecting one or more substances to be distributed onto an area of interest;
- adjusting the condition parameter(s) for one or more conditions to which the corresponding condition(s) of a sample area are to be compared;
- selecting a mode of operation between distributing or not distributing a substance or substances via at least one independently operable outlet associated with a sensor or sensors when:
  - the sample area proximate at least one sensor or group of sensors is detected by the sensor(s) as having one or more conditions which meet at least one predetermined condition parameter for that or those condition(s); or
  - the sample area proximate at least one sensor or group of sensors is detected by the sensor(s) as having one or more conditions which do not meet at least one predetermined condition parameter for that or those condition(s).

Thus preferred embodiments of the present invention may have a number of advantages over the prior art which may include:
- the selective application of substances to or not to individual plants, or at least a small number of plants in a pasture;
- a reduction in the quantity of substances used;
- prevention of leaching due to over application of substances;
- reduction of N2O emissions providing a greater number of options in terms of:
- the types of substances that can be distributed, the number and effect of conditions which influence the distribution of substances. For example, application of substances on each, or any one of; a high level, a preferred level, or a low level in relation to condition(s) of the area of interest.

BRIEF DESCRIPTION OF THE DRAWINGS

Further aspects of the present invention will become apparent from the following description which is given by way of example only and with reference to the accompanying drawings in which.

BEST MODES FOR CARRYING OUT THE INVENTION

Figure 1:
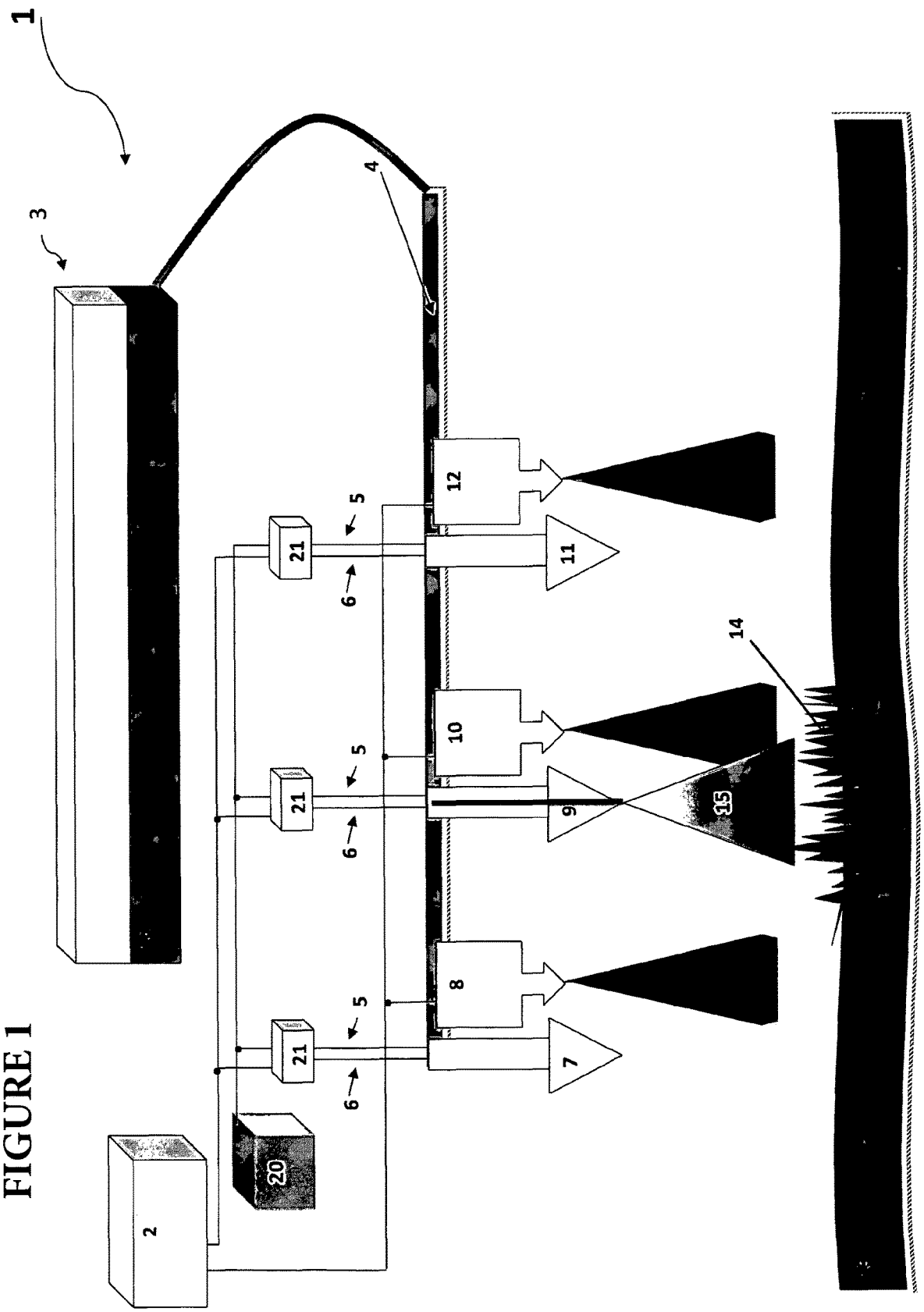
FIG. 1 is a schematic representation of one preferred embodiment of the present invention operating in a first mode of operation.

With respect to FIG. 1, there is shown an apparatus for the distribution of a substance onto a pasture, as generally indicated by arrow 1. The apparatus includes a control system (2), a source of substance in form of reservoir (3) for holding the substance prior to distribution, a transfer line (4) by which the substance is transported to a plurality of independently operable outlets in the form of nozzles (7, 9, 11). Each nozzle (7, 9, 11) has associated with it a sensor (7 with 8, 9 with 10 and 11 with 12) for detecting one or more conditions associated with the sample area (13, 14) proximate the sensor (8, 10, 12). Each sensor 8, 10, 12 is connected to control system (2) which determines whether the sensor data meets a user configured condition parameter or parameters and activates or deactivates relays (21) accordingly. Depending on the positioning of selector switch (20) the relays either activate or deactivate the independently operable outlet (7, 9, 11) to which they are associated by way of control lines (5,6). Whilst the present invention is described as having a single control system, it will be appreciated that each sensor and associated independently operable outlet could have its own dedicated control system.

In the example illustrated by FIG. 1, the area of interest is a pasture and the substance in the reservoir (3) is nitrate inhibitor (16). The condition being sensed is the level of chlorophyll content (which is directly related to the level of nitrogen) of the sample area plant or groups of plants (13, 14) proximate the sensors (8, 10, 12). The condition parameters (not shown) for the level of chlorophyll content has been adjusted for the desired plant size for the pasture. The mode of operation has been selected by the user (not shown) by way of selector switch (20) to distribute nitrate inhibitor (16) to the plant or groups of plants (13, 14) proximate an independently operable outlet (7, 9, 11), detected by the sensor(s) (8, 10, 12) as having a level of chlorophyll content which exceeds the predetermined condition parameter for the level of chlorophyll content for the desired plant size for the pasture.

As the apparatus of FIG. 1 is moved across the pasture or field, the sensors (8, 10, and 12) continuously analyse the chlorophyll content levels of the plants or groups of plants (13, 14) as they pass over them. The level of chlorophyll content sensed by the sensors (8, 10, 12) is relayed to control system (2), wherein the sensed level of chlorophyll content of the plants (13, 14) is compared to the condition parameters set by the user of the apparatus (not shown). For the instantaneous moment illustrated in FIG. 1, the plant or group of plants (13) sensed by the outermost sensors (8, 12) are processed by control system (2) and determined to be within, or below, the condition parameters for chlorophyll content levels set by the user, the chlorophyll content levels of the plant or group of plants (14) sensed by the middle sensor (10) is determined by the control system (2) to be greater than the condition parameters set by the user, the control system (2) activates only the middle spray nozzle (9) and nitrate inhibitor (16) is distributed (15) onto the plant or group of plants (14). This process is performed on a continuous basis as the apparatus travels across the pasture.

Figure 2:
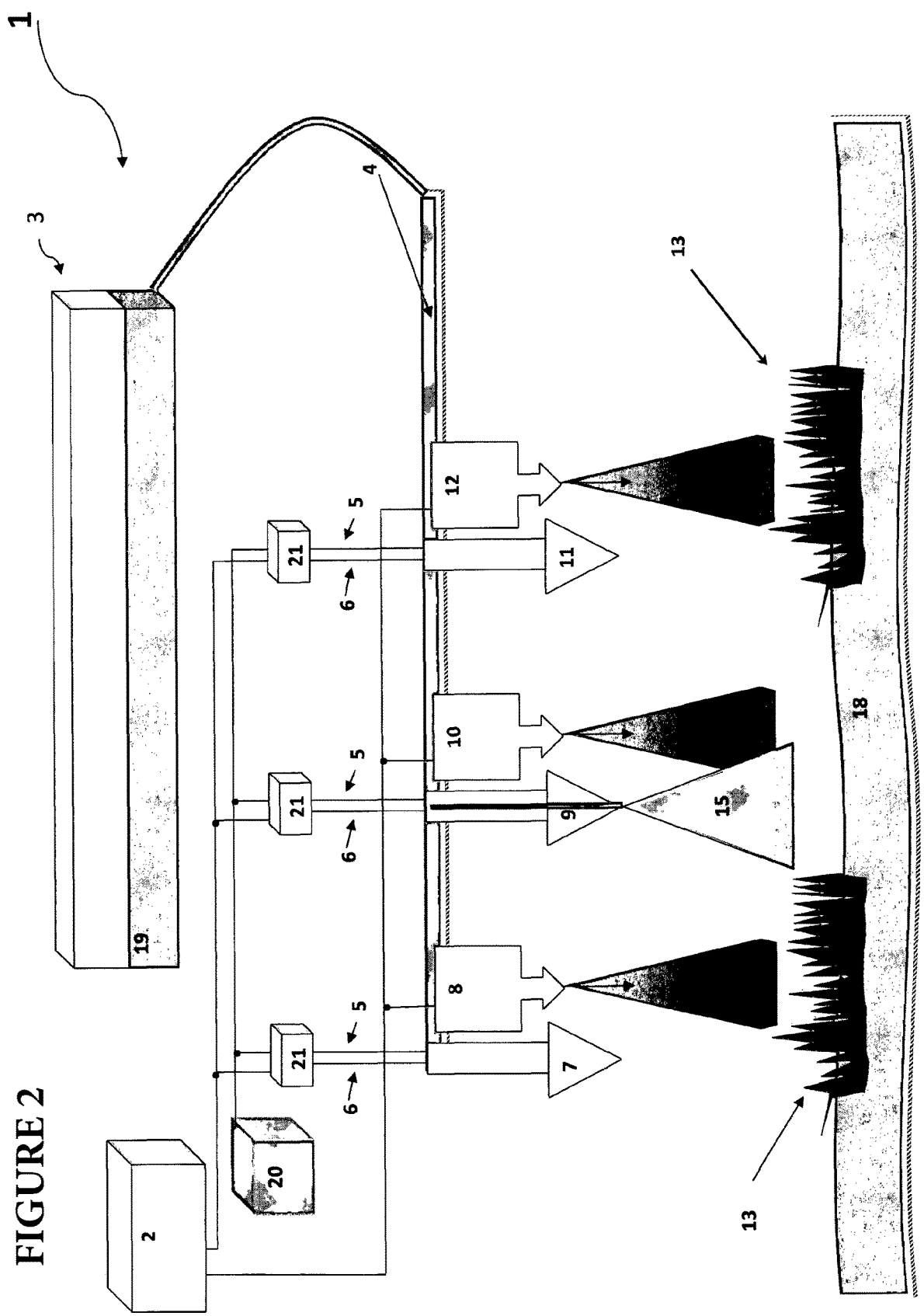
FIG. 2 is a schematic representation of the preferred embodiment of the present invention of FIG. 1 operating in a second mode of operation.

In the example illustrated by FIG. 2, the area of interest is a pasture and the substance in the reservoir (3) is nitrogen (19). The condition being sensed is the level of chlorophyll content (which is directly related to the level of nitrogen) of the sample area plant or groups of plants (13, 18) proximate the sensors (8, 10, 12). The condition parameters (not shown) for the level of chlorophyll content has been adjusted for the desired plant colour and/or size for the pasture. The mode of operation has been selected by the user (not shown) by way of selector switch (20) to withhold distribution of nitrogen (19) to the plant or groups of plants (13, 18) proximate an independently operable outlet (7, 9, 11), detected by the sensor(s) (8, 10, 12) as having a level of chlorophyll content which meets or exceeds the predetermined condition parameter for the level of chlorophyll content for the desired plant colour and/or size for the pasture.

As the apparatus is moved across the pasture or field, the sensors (8, 10, and 12) continuously sense the chlorophyll content levels of the plants (13, 18) as they pass over them. The level of chlorophyll content sensed by the sensors (8, 10, 12) is relayed to control system (2) wherein the sensed level of chlorophyll content of the plants (13, 18) is compared to the condition parameter set by the user of the apparatus (not shown). For the instantaneous moment illustrated in FIG. 2, the plant (13) chlorophyll content levels sensed by the two outermost sensors (8, 12) are processed by control system (2) and determined to be greater than the predetermined condition parameter for chlorophyll content set by the user. The chlorophyll content levels of the plant (18) sensed by the middle sensor (10) is determined by the control system (2) to be less than the condition parameter set by the user, the control system (2) activates the middle spray nozzle (9) and nitrogen (19) is distributed (15) onto the plant or group of plants (18).

Aspects of the present invention have been described by way of example only and it should be appreciated that modifications and additions may be made thereto without departing from the scope thereof as defined in the appended claims.

What I claim is:

1. An apparatus for applying substances to an area of interest wherein the apparatus comprises:
   a. a plurality of sensors for sensing one of a plurality of sub-areas of the area of interest, each sensor generating a detection signal associated with a respective sub-area upon detection of a sub-area considered to have a chlorophyll intensity above a threshold level;
   b. a mode selector having a first state and a second state;
   c. a control circuit which produces a respective control signal associated with each detection signal, wherein the control circuit operates in a first mode when the mode selector is in the first state and a second mode when the mode selector is in the second state; and
   d. a plurality of outlets each associated with a respective one of the sensors, each responsive to the respective control signal from the control circuit and positioned to spray a substance on a sub-area associated with the respective one of the sensors;
   wherein the control circuit is operable in:
      i. the first mode to apply the respective control signal to each outlet to maintain it open except when the detection signal is present; and
      ii. the second mode to apply the respective control signal to each outlet to open it only when the detection signal is present.

2. An apparatus as claimed in claim 1 wherein the control circuit includes a relay associated with each outlet which in the first mode is normally closed and in the second mode is normally open.

3. An apparatus as claimed in claim 2 wherein the mode selector is a switch that controls the relays to operate in the first mode or the second mode.

4. The apparatus of claim 3, wherein each relay is located on one or more control lines between the selector switch and the relay's respective outlet.

5. The apparatus of claim 1, wherein the first mode is a nitrate-application mode.

6. The apparatus of claim 1, wherein the second mode is a nitrate-inhibitor mode.

* * * * *